United States Patent [19]

Wilkins

[11] Patent Number: 5,608,137
[45] Date of Patent: Mar. 4, 1997

[54] POLYMER GEL BARRIER CONTAINING MICROORGANISMS FOR CONTAINMENT OF HAZARDOUS WASTE

[75] Inventor: Ebtisam Wilkins, Albuquerque, N.M.

[73] Assignee: University of New Mexico, Albuquerque, N.M.

[21] Appl. No.: 380,673

[22] Filed: Jan. 27, 1995

[51] Int. Cl.$^6$ ................................................. A62D 3/00
[52] U.S. Cl. ........................ 588/259; 405/128; 588/249; 588/255
[58] Field of Search ........................ 405/128, 129, 405/266, 267; 588/259, 258

[56] References Cited

U.S. PATENT DOCUMENTS

| | | | |
|---|---|---|---|
| 4,293,440 | 10/1981 | Elphingstone et al. | 405/266 X |
| 4,799,549 | 1/1989 | Vinot et al. | 405/266 X |
| 5,013,185 | 5/1991 | Taki | 405/266 X |
| 5,030,036 | 7/1991 | Huff et al. | 405/266 |
| 5,133,625 | 7/1992 | Albergo et al. | 405/128 X |
| 5,174,378 | 12/1992 | Costerton et al. | 405/267 X |

*Primary Examiner*—Dennis L. Taylor
*Attorney, Agent, or Firm*—Robert W. Becker

[57] ABSTRACT

A method of containing and remediating contaminants within the soil includes the step of placing a gel barrier into the soil for containing the contaminants. The gel barrier and the soil contained therein define the containment zone. Microorganisms capable of remediating the contaminants in the soil are added to the containment zone. The gel barrier is produced by preparing an aqueous solution of a gel precursor, injecting the aqueous solution into the soil at a desired location, and crosslinking in situ the gel precursor to form the gel barrier at the desired location.

29 Claims, 3 Drawing Sheets

POLYMER GEL BARRIER CONTAINING MICROORGANISMS FOR CONTAINMENT OF HAZARDOUS WASTE

BACKGROUND OF THE INVENTION

The present invention relates to a polymer gel barrier for the containment of hazardous waste in the soil.

Soil and ground water contamination has become a more and more pressing issue due to growing public concern about environment and health. Remediation of soil contamination can be achieved by removal of the contaminated soil, by chemical or biological modification at the contamination site, and by retention of the contaminants within the soil in order to prevent migration to aquifers.

The removal of contaminated soil is expensive due to the use of heavy machinery and the required transport to a designated storage or remediation location. Furthermore, the removal of contaminated soil without further chemical or biological treatment does not solve the contamination problem, but merely moves the problem to a different site.

Chemical and/or biological treatment of the contamination at the site is attractive, but depends greatly on the nature of the contaminants and the soil chemistry.

Chemical treatment generally is based on the fixation of the contaminants within the soil in order to prevent further migration into the aquifer. Such an approach is usually only practical for small and well defined sites and for very specific contaminants.

Biological treatment of contamination within the soil takes advantage of indigenous microorganisms at the site or employs specially engineered microorganisms designed to degrade a certain contaminant or class of contaminants.

Retention of contamination within the soil is usually a temporary measure and relies on establishing a barrier to drastically reduce contaminant transport and diffusion. Retention barriers are only feasible if horizontal strata that are impermeable to the contaminants are present within the soil at a relatively shallow depth so that a vertical barrier can be constructed down to the impermeable stratum at reasonable cost. If no horizontal, impermeable strata are present, it will be necessary to provide an engineered horizontal barrier. This is possible from a technological standpoint, but proves to be very expensive.

The use of grouting is a temporary measure for dispersal retardation of contaminants during the period of removal of the contaminants by other means. For example, a vertical wall can be constructed by injection of a cement-bentonite grouting material above an impermeable horizontal clay layer so that contaminant migration through the wall is reduced to a minimal amount over a period of years.

However, the injection of cement-bentonite-based grouting material is technologically difficult because great pressures are required for injecting the cement-bentonite slurry into the ground. Also, it is difficult to control the extent of the injection range.

Cement-based materials for engineering a retention barrier are the most commonly used materials despite the high cost of pumping for injecting the materials into the ground. Such materials have the advantage that they set hard and are substantially water-resistant. By adding adsorbing materials such as bentonite an enhanced surface area is provided and the cation exchange capabilities are increased. Such materials have the ability to bind many organic or inorganic compounds: for example, metals are immobilized by the formation of hydroxides or basic carbonates. One drawback is that cement mixtures have a high pH (greater than 12) and certain toxic metals, such as lead, chromium, copper, and nickel, show an increased solubility at such high pH values. Thus, such a cement barrier potentially could enhance the transport of such metals. Another disadvantage is that the setting of cements can be retarded by organic solvents and oils, by sulfates, and halides.

A general technical problem of conventional barrier construction by grouting or by slurry wall techniques is that excavation or pumping or both must be employed in order to put the viscous substances in place. Such grouting or slurry wall techniques are thus limited in their application because of their excessive costs. Another disadvantage is that their application is limited to shallow depths.

Lime-based (calcium oxide or hydroxide) barriers are very similar in their behavior to the barriers made of cement-based material. These materials behave similarly to the cement-based materials and are also characterized by a high pH value and slow setting properties. Water glass polymers (alkali silicates) have also been used as retention barriers. For example, the Chemfix process employs water glass. Such water glass barriers work well for transition metal contaminants since insoluble silicates are formed. However, silicate barriers are ineffective for the retention of chloride ions and monovalent cations.

It has also been suggested to use thermoplastic barriers as a retention means for contaminants. However, thermoplastic materials require heating of the material for injection and thus make the injection process very expensive. Furthermore, thermoplastic materials upon heating release organic components. Also, oxidizers, sulfates, or halides can undergo undesirable reactions with these thermoplastic materials.

It is also known to use organic polymer barriers based on urea-formaldehyde resin and polyacrylamide. Polyacrylamide has been employed by the oil industry for tertiary recovery processes where advantage is taken of the high viscosity and immiscibility of these polymers with oil and water. However, some organic solvents and oils may retard gelation of the polymer material and reduce the efficiency of the barrier.

It is an object of the present invention to provide a method for forming a containment barrier with a polymeric barrier material that is soluble in water before gelation and insoluble after gelation. The polymeric barrier material should have a controllable gelation time and a viscosity before injection similar to that of water in order to substantially reduce pumping costs.

SUMMARY OF THE INVENTION

The present invention provides a method of containing and remediating contaminants within the soil, which method is primarily characterized by the following steps:

Placing a gel barrier into the soil for containing the contaminants, wherein the gel barrier and the soil contained therein form a containment zone; and Adding microorganisms, capable of remediating the contaminants in the soil, to the containment zone.

Preferably, the step of placing includes the step of preparing a low viscosity aqueous solution of a gel precursor; injecting the aqueous solution into the soil at a desired location with a means for injecting; and crosslinking in the soil the gel precursor to form the gel barrier at the desired location with the desired geometry.

Preferably, the step of adding microorganisms is combined with the step of preparing an aqueous solution.

In another embodiment of the present invention the step of adding microorganisms includes the step of placing the microorganisms into the soil along an inner wall surface of the gel barrier. The microorganisms can also be placed throughout the soil.

Preferably, the step of placing the microorganisms is carried out by injection. Advantageously, the microorganisms are injected after the step of injecting the aqueous solution with the same means for injecting used for injecting the aqueous solution.

Advantageously, the gel precursor further comprises a cross-linking agent and a catalyst.

In a preferred inventive embodiment the organic monomer of preferably low-molecular weight polymers s selected from the group consisting of ethylene oxide, hydroxyethyl methacrylate, acrylamide, vinyl chloride, and sulfone monomer.

Advantageously, the organic monomer is a mixture of urea and formaldehyde.

Preferably, the gel precursor comprises alkali silicate.

Advantageously, the step of injecting includes drilling a plurality of bore holes for reaching the desired location within the soil.

The step of adding microorganisms may include the step of preparing a nutrient solution and suspending the microorganisms in the nutrient solution. This step is, of course, only necessary if the microorganisms are alive. It is possible to use dead microorganisms instead which function as well for the intended purpose. The microorganisms can be freely suspended or immobilized on tiny beads made of glass or plastic etc.

Advantageously, the nutrient is a carbon source. The carbon source is preferably glucose.

In a preferred embodiment of the present invention the step of adding microorganisms includes the step of suspending the microorganisms in an aqueous solution. Preferably, the microorganisms are yeasts and/or fungi.

In another inventive embodiment the method further includes adding an impermeability-increasing material to the gel barrier.

The present invention also relates to a system for containing and remediating contaminants within the soil, wherein the system comprises:

A gel barrier installed in the soil wherein the gel barrier and the soil contained therein form a containment zone; and Microorganisms added to the containment zone.

The gel barrier is comprised of a polymer selected from the group consisting of polyethylene oxide, polyhydroxyethyl methacrylate, polyvinyl chloride, polysulfone, sodium silicate polymer, polyacrylamide, and urea-formaldehyde polymer.

The microorganisms are preferably yeasts and/or fungi. Advantageously, the microorganisms are contained within the gel barrier. In another embodiment of the present invention, the microorganisms are located along an inner wall surface of the gel barrier. The microorganisms can also be distributed throughout the soil.

Expediently, the gel barrier comprises an impermeability-increasing material.

The present invention proposes to employ a polymer gel barrier that is highly impermeable to the contaminants present the soil. The barrier is to be formed by injection of ungelled polymer (gel precursor) into the ground such that the gel precursor will gel within the soil in a controlled fashion. The gist of the present invention is to inject an ungelled polymer (gel precursor) into the soil which will gel to form the desired polymer gel barrier in situ. The material to be injected, preferably via drill holes, should have a viscosity and density close to that of water so that the pumping power and costs will be very low compared with the installation of conventional barriers such as cement-based barriers.

The gel barrier formed in situ is comprised of a strongly cross-linked gel that is highly impermeable to the contaminants, especially when materials, that further increase impermeability due to their inherent properties, are added. Such materials can be a wax or any other material of similar properties or materials in powder form such as bentonite or other clay materials that are known to increase the impermeability of soils.

The exact shape or design of the barrier or wall is, of course, site-specific and depends on the nature and location of the soil strata and permeable layers within the soil as well as on the nature of the contaminants.

The low viscosity and controllable gelation of the proposed gel barrier material also allows for the use deeper drill holes and larger numbers of drill holes. A further advantage is that the gel precursor, due to its low viscosity is able to penetrate much farther into the soil and into fractured rock than highly viscous grouting materials before gelation takes place.

Preferred polymers for the inventive gel barrier are the following:

| Polymer | Code | Supplier |
|---|---|---|
| polyvinylpyrrolidone | PVP | GAF Company |
| Polyox | | Union Carbide Co. |
| sodium meta silicate | SS | J. T. Baker Inc. |
| polyacrylamide (acrylamide copolymer) Cyanamer A-370 (polyacrylamide) | PAA | American Cyanamid Co. |
| experimental polymer XD-30108.01 Carboxel R265 | | Dow Chemical |
| Jaguar 8836 | J6 | Rhone Poulenc Inc. |
| Rhodopol 23 (Xantham gum) | R20 | Rhone Poulenc Inc. |

In order to provide a controllable cross-linking process to form a stronger gel and to render the gel insoluble, several cross-linking agents can be used alone or in combination. Examples of such cross-linking agents are listed below.

| Cross-linking agent | Code | Supplier* |
|---|---|---|
| Glyoxal (40%) | G | VWR Sci. Co. |
| AlK(SO$_4$)$_2$.12H$_2$O | AK | |
| potassium ferric cyanide | | |
| N,N' methylene-bisacrylamide | | Am. Cyanamid Co. |
| CrCl$_3$.6H$_2$O | CC | Mallinckrodt |
| dimethylamine ethylamine | | |
| dimethylaminopropionitrile | DMPAN | Fischer Sci. Co. |
| ferrous chloride | F2 | |
| ferric chloride | F3 | |

-continued

| Cross-linking agent | Code | Supplier* |
|---|---|---|
| borax $Na_2B_4O_7 \cdot 10H_2O$ (sodium borate) | B6 | |
| Tyzor | T201 | Du Pont |

*Where no supplier is named, the material has been secured from various suppliers.

In addition to the cross-linking agents several oxidizers can be used as a catalyst for controlling the gelation reaction. They include: ammonium persulfate and potassium persulfate, available from Fisher Science Company and other chemical suppliers, and sodium hypochlorite, available, for example, from Dow Chemical.

In order to control the pH value during gelation, compounds such as sulfuric acid, hydrochloric acid, acetic acid (glacial; Eastman); trisodium phosphate, and ammonium hydroxide (Fisher Sci. Company) are used.

The gel material or polymeric material to be used for the inventive retention barrier must satisfy the following criteria:

1. Soluble in cold water before gelation and insoluble after gelation;
2. Low viscosity before gelation, high viscosity after gelation;
3. Stable and immiscible chemically and physically in water after gelation;
4. Inexpensive and readily available;
5. Low coefficient of volumetric expansion over temperature range of the ground;
6. Inert and non-toxic;
7. Non-degradable over several years chemically as well as biologically; and
8. Sufficient rate of absorption in the soil to form the barrier needed.

The gel materials to be used for the present invention must exhibit a good physical, chemical, and thermal stability and must also display all of the desirable features for a mechanically strong and stable gel structure. The polymers or monomers to be used as a gel precursor should allow for a relatively quick coupling with the cross-linking agents.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENT

Figure 1:
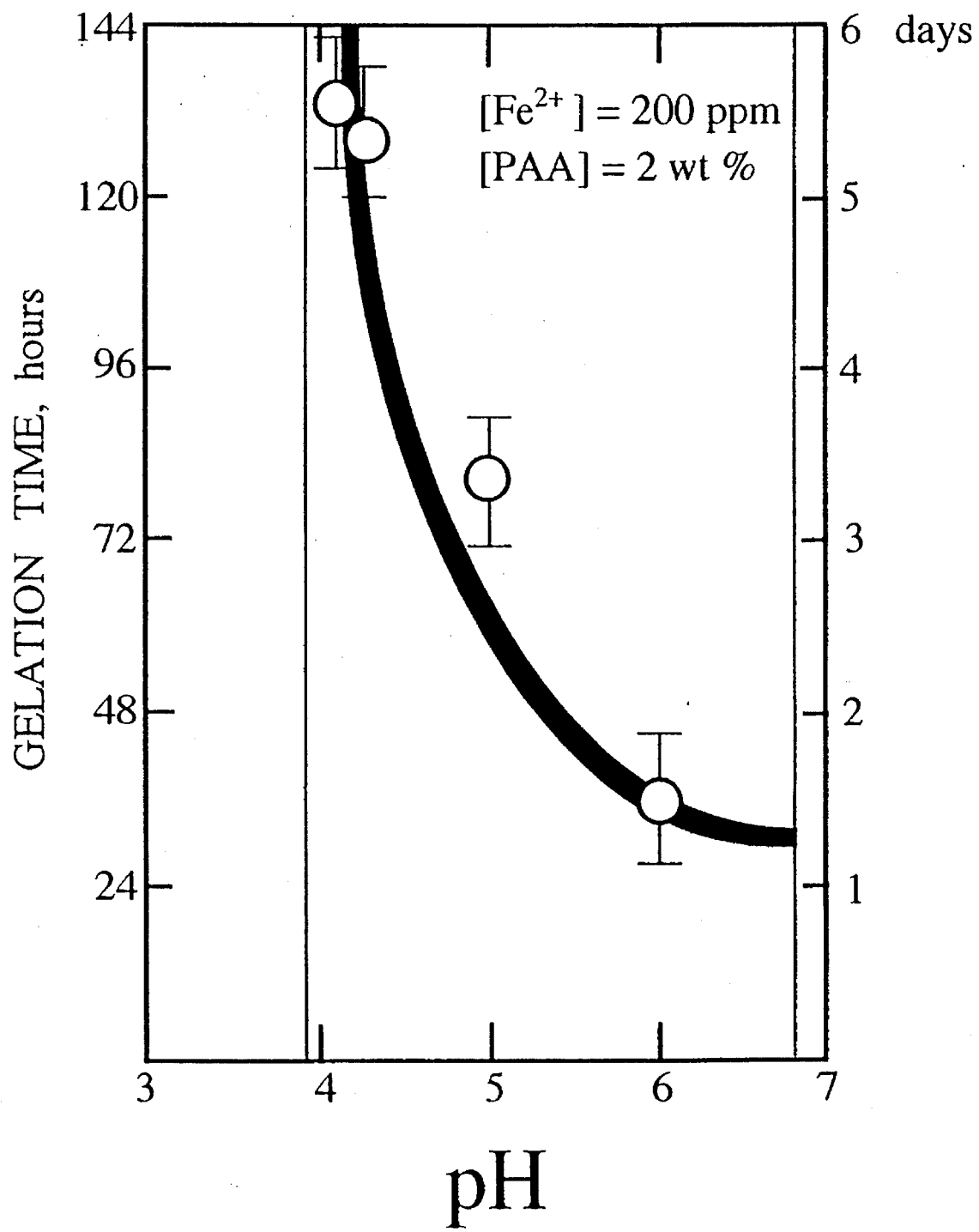
FIG. 1 shows the effect of pH on gelation time using a fixed concentration of PAA and $Fe^{2+}$ cross-linking agent.

In order to assess the suitability of certain polymers or polymer precursors as candidates for gel barriers the viscosity, density, and gelation time as well as the general characteristics as a function of pH and polymer concentration must be determined. The gelation time strongly depends on the pH value and the cross-linking agent used. For example, R20=Rhodopal 23 (Xantham Gum, Rhone Poulenc, Inc.) with chromium chloride (CC) as a cross-linking agent gels in one to two days at a pH of 4 to 6. At a pH of 6 and the addition of a different cross-linking agent (ferric chloride, F3) gelation can occur within one hour. Sodium silicate (SS), which is widely used in grouting, gels quickly between a pH of 7 to 8 and forms a weaker gel at other pH values. The following Table 1 shows combinations of gel precursor and cross-linking agent at the optimum pH value and the resulting gelation times.

TABLE 1

| Gelation Time as a Function of pH | | |
|---|---|---|
| Gel Mixture | pH | Time |
| J6,B6 | 8.6–10.6 | Forms gel quickly |
| R20,CC | 4–6 | Forms in 1–2 days |
| PAA,CC | 4–6 | Forms in 4 minutes– 2.5 hours; pH controlled |
| R20,T201 | 3.4–9 | Forms in 2–4 hours |
| PAA,GST* | About 8 | Forms in 1 day |
| J6,T201 | 5 or greater | Forms quickly, pH controlled |
| R20,F3 | 6 | Forms in 1 hour |
| SS,A2** | 7–8 | Forms quickly |

*GST = glyoxal - sodium hypochlorite-trisodium phosphate
**A2 = hydrochloric acid The density of the materials for producing the gel barrier were measured by standard pycnometer methods using tap water as a reference at ambient temperature. Viscosity was measured by two methods at ambient temperature with a Thomas-Stormer viscometer and the Boekel viscometer. Relative viscosity was measured with respect to pure glycerol and tap water.

The density and viscosity of various gels produced at optimized pH and with a preferred cross-linking agent are represented in Table 2.

TABLE 2

| Density and Viscosity Measurements at Ambient Temperature of Various Gels (water density 0.997 g/ml). | | |
|---|---|---|
| Gel Mixture | Density of Gel (g/ml) (±0.002 g/ml) | Viscosity of Gel (cp) |
| J6,B6 | 1.001 | >230000 |
| J6,B6 | 0.999 | >5600 |
| J6,T201 | 0.999 | >150000 |
| R20,CC | 0.998 | solid |
| R20,AK | 1.001 | >1400 |
| R20,F3 | 1.000 | >28000 |
| R20,T201 | 1.003 | >3000 |
| PAA,F2 | 1.003 | >112000 |
| PAA,AK | 1.005 | >140000 |
| PAA,F3 | 1.009 | >29000 |
| PAA,GST* | 1.005 | >230000 |
| PAA,CC | 1.009 | >230000 |
| SS,A1** | 1.067 | solid |
| SS,A2*** | 1.043 | solid |

*GST = glyoxal-sodium hypochlorite-trisodium phosphate;
**A1 = sulfuric acid;
***A2 = hydrochloric acid In general, the density of the gel precursor at ambient temperature is similar to or slightly higher than that of water since the main component of the gel precursor is water. The viscosity increases dramatically upon gelation, sometimes exceeding the limits of any standard viscometer used to determine viscosity.

A preferred gel precursor for the gel barrier is polyacrylamide (PAA). The preferred cross-linking agent for this gel is $Cr^{3+}$, especially $CrCl_3$ (CC). Other effective cross-linking agents are ferric (F3) and ferrous (F2) chloride which are less toxic and less expensive than $Cr^{3+}$.

The effect of pH on the gelation time of PAA was investigated and the results are represented in Table 3.

TABLE 3

The effect of pH on the gelation time and viscosity of PAA with $Fe^{2+}$ cross-linking agent

| pH | Gelation Time days | Viscosity (cp)[a] 8 days later | Viscosity (cp)[b] 17 days later | Appearance |
|---|---|---|---|---|
| 3.2 | c | 648 | 705 | fluid (yellowish, transparent) |
| 3.9 | 30 | 302 | 314 | fluid (yellowish, transparent) |
| 4.6 | 5–6 | d | >26000 | gel (yellow, transparent) |
| 4.7 | 5–6 | d | >124000 | gel (yellow, transparent) |
| 5.0 | 3–4 | d | >112000 | gel (yellow, transparent) |
| 6.0 | 1–2 | d | >17000 | gel (yellow, transparent) |
| 6.8 | c | 65 | 83 | fluid (red, turbid) |
| 7.1 | c | 86 | 118 | fluid (red, turbid) |

[a]The Boekel viscometer was used.
[b]The Stormer viscometer was used.
[c]Does not gel in 30 days
[d]Out of the range of Boekel viscometer The system was comprised of 2% hydrolyzed PAA and $Fe^{2+}$ (F2) in the form of $FeCl_2 \cdot 4H_2O$ (200 ppm $Fe^{2+}$) at room temperature over the pH range of 3 to 7. A pH range of 4.6 to 6 proved to be optimal for gelation (see also FIG. 1). It was observed that at a pH of greater than 6 a colloidal form of $Fe^{2+}$ was present. Such colloidal form of $Fe^{2+}$ appears to be inactive in cross-linking.

Figure 2:
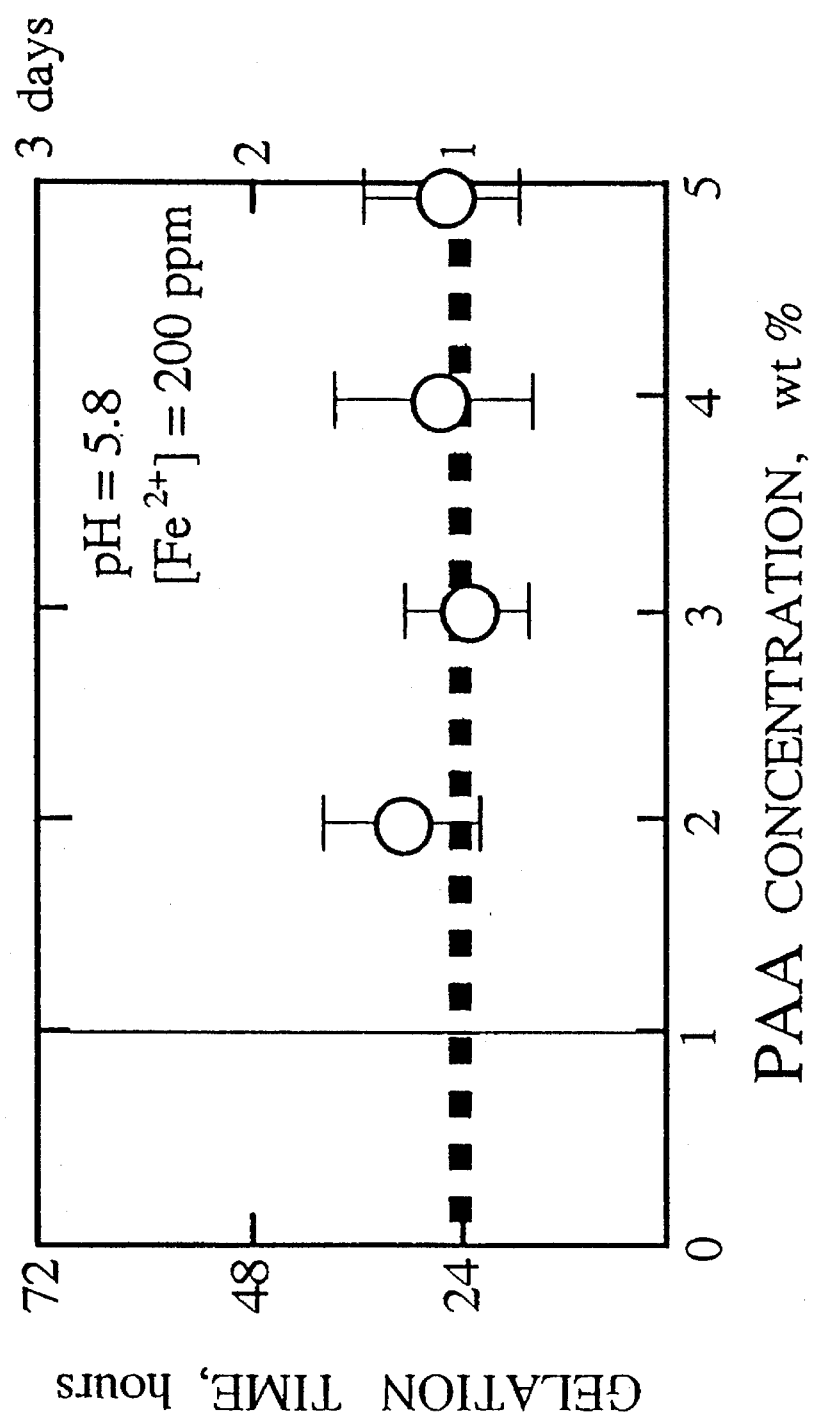
FIG. 2 shows the effect of PAA concentration on gelation time at fixed pH and fixed $Fe^{2+}$ concentration.
Figure 3:
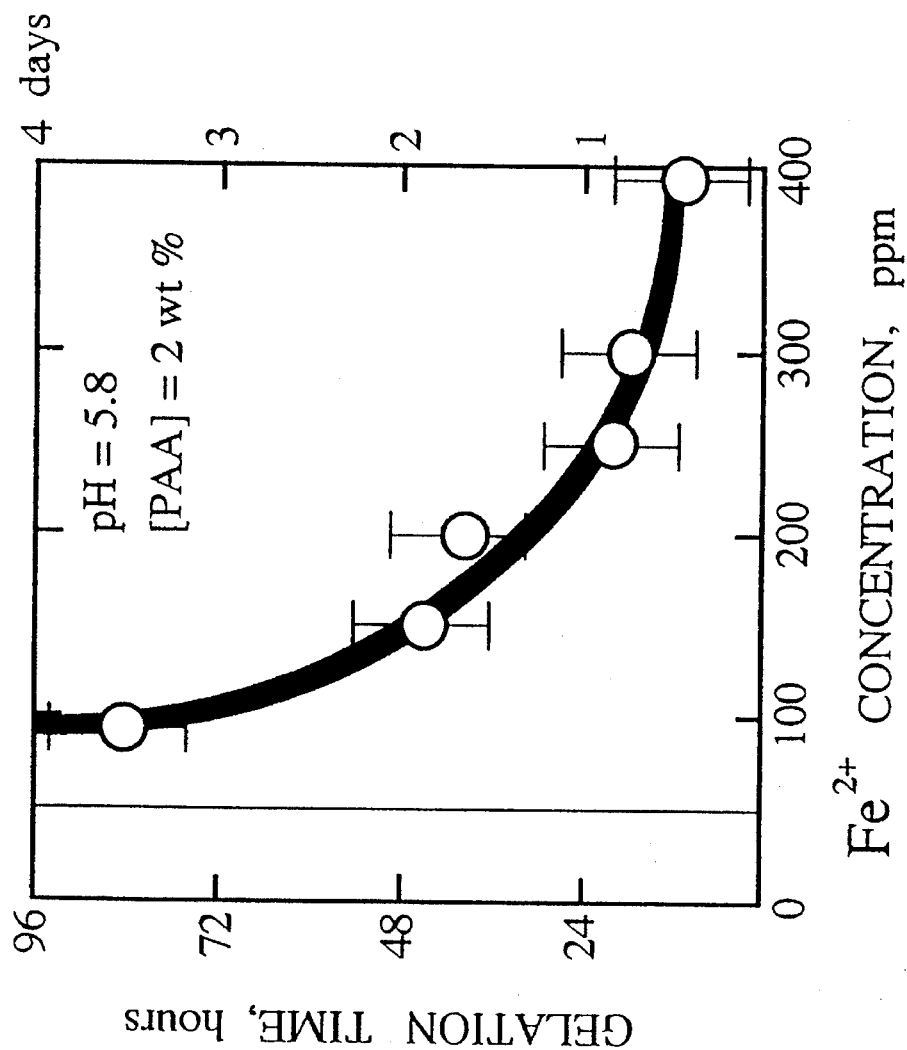
FIG. 3 shows the effect of cross-linking agent on gelation time for fixed pH and fixed PAA concentration.

The effect of the concentration of PAA on the gelation time was examined at a pH of 5.8 with a fixed concentration of cross-linking agent $Fe^{2+}$ of 200 ppm at room temperature (see FIG. 2). Below a concentration of 1% of PAA no gel formed. On the other hand, there was no apparent concentration effect within a range of 2–5% on the gelation time (FIG. 2). The concentration of the cross-linking agent however has a significant effect on the gelation time (FIG. 3).

The viscosity will increase dramatically after gelling and the control of the gelation time is very important for the in situ use of the gel as a retention barrier. For the above described system of PAA cross-linked with $Fe^{2+}$, the gelation time can be adjusted by varying the pH and the concentration of $Fe^{2+}$ in accordance to the site-specific characteristics. In order to properly design an effective gel barrier the porosity and permeability of the soil at the site must be taken into consideration. The pH of the strata material and the effects of water in the strata on gel swelling must also be taken into consideration. The combination of site-specific properties (porosity, water content, and pH) and gel specific characteristics such as density, viscosity, and gelation time have to be considered together as part of the overall barrier design.

The present invention combines the use of a retention gel barrier and a biological remediation process in order to remediate a contamination site. Biological remediation uses indigenous microorganisms or engineered microorganisms that are specifically developed to digest certain contaminants. Especially useful are fungi and yeasts since they are members of the natural soil ecosystem and can generally survive in extreme environmental conditions. Fungi and yeasts can be readily grown in culture and the culture media are in general inexpensive. A further advantage of fungi and yeast microorganisms is that they can grow in broth (in the form of suspended particles) or on solid media. Furthermore, under appropriate conditions they can grow as single cells or as a uniform filament of multiple cells. Certain types of yeast are readily available in large quantities at low cost from industrial sources.

The gel barrier, which will be engineered by introducing or injecting the gel precursor into the soil at a predetermined location in order to contain therewith the contaminant plume, serves primarily as a contaminant barrier for preventing migration of the contaminants out of the enclosed area. Bioremediation within this enclosed area (containment zone) can be achieved by injecting microorganisms into the soil, by introducing microorganisms into the gel barrier, or by placing microorganisms into the vicinity of the inner wall surface of the gel barrier or any combination thereof. Injection techniques for introducing liquid or viscous material into the soil are well known in the field and need not be discussed in the context of this invention. It is possible to introduce the microorganisms into the gel precursor before injecting the gel precursor into the soil so that the microorganisms are contained within the gel barrier that is formed in the soil. By introducing microorganisms into the gel barrier it is ensured that contaminants entering the gel barrier will be digested/remediated by the microorganisms so that no contaminants can migrate through the gel barrier. It is possible to provide a zone of microorganisms adjacent to the inner wall surface of the gel barrier so that migrating contaminants will be digested or remediated by the microorganisms before they enter the gel barrier. Such placement can be used alone or in combination with microorganisms in the gel barrier.

One particular application of the inventive method is the remediation of oil or hydrocarbon spills. The gel barrier then serves to immobilize the oil or hydrocarbon pollutant and serves as a sponge to absorb the chemical contaminants, whereby the oil or hydrocarbon can be digested with the addition of microorganisms injected into the polymer gel and/or into the contaminated soil.

The addition of wax or wax-like materials or of bentonite or other clay materials, which increase the impermeability of the gel barrier, aids in absorbing hydrocarbon-based materials in the gel barrier, respectively, in the added materials (wax, bentonite etc).

COLUMN EXPERIMENTS

The following column experiments were carried out to simulate the in situ application of the inventive method. As a first step, zero seepage velocity was assumed in the experiment, and only the diffusion mechanism was studied. As a pollutant heavy metals were studied. The heavy metal ion uptake capacity of yeast was examined.

Preparation of Gel Precursor

Exemplary PAA gel precursors were prepared according to the specifications in Table 4.

TABLE 4

Exemplary gel precursor compositions

|  | A | B | C |
|---|---|---|---|
| Monoacrylamide (weight %) | 2.0 | 5.0 | 7.64 |
| Water (weight %) | 97.9 | 94.7 | 92.0 |
| N,N'-methylene-bisacrylamide (weight 5) | 0.05 | 0.037 | 0.06 |
| Ammonium persulfate (weight %) | 0.05 | 0.3 | 0.29 |
| N,N,N',N'-tetra-methylethylene-diamine (weight %) | 0.03 | — | — |
| Dimethylamino-propionitrile (weight %) | — | 0.01 | 0.023 |

All gel precursors showed excellent gelling properties within the specifications of the present invention.

Column Experiment 1

Two experiments, one with yeast and a control without yeast, were carried out. Soil was placed into a column, and the PAA gel precursor B (5% in water), as described above, was added and gelled in situ with crosslinking agent $Cr^{3+}$ to simulate the in situ soil/gel barrier. The soil-gel ratio is 1:1 (g/mL). In the column the height of the soil/gel barrier was 3.0 cm, and the porosity of the barrier was about 0.72. An aqueous solution of $CuSO_4 \cdot 5H_2$ (530 ppm $Cu^{2+}$) was used as the pollutant source, and 2.5% (wt./vol.) of yeast was added to the solution. The $Cu^{2+}$ concentrations below and above the barrier were monitored throughout the experiment period. After 11 days a yeast sample was collected, dissolved by adding strong acid (HCl), and the uptake of $Cu^{2+}$ was determined. (It was assumed that the yeast growth rate was near zero because of the lack of nutrients, and the fresh yeast was used as a control.)

After 11 days it was found that 61.7% of $Cu^{2+}$ was taken up by the yeast, and 10% of $Cu^{2+}$ was adsorbed by the soil/gel barrier. No $Cu^{2+}$ ion penetrated the soil/gel barrier. The average uptake by the yeast and the ion exchange content of soil were 13 mg $Cu^{2+}$/g yeast and 0.128 mg $Cu^{2+}$/g soil, respectively.

A control experiment was carried out using the same gel barrier material and soil in a column without yeast. The same $Cu^{2+}$ solution was used. After 11 days it was found that 70% of $Cu^{2+}$ was adsorbed by the soil/gel barrier. Also, no $Cu^{2+}$ ion had penetrated the soil/gel barrier. The average ion exchange content of the soil was 0.894 mg $Cu^{2+}$/g soil.

The experiments demonstrate that the gel barrier is effective in retaining a contaminant and that yeast (i.e., microorganisms) are able to remove the contaminant from the soil or solution (i.e. remediation takes place).

Column Experiment 2

Two experiments, one with yeast and a control without yeast, were carried out. A soil/gel mixture of 2:1 (g/mL) was used in the second column experiment. Soil was placed into a column, and the PAA gel precursor B (5% in water), as described above, was added and gelled in situ with crosslinking agent $Cr^{3+}$ to simulate the in situ soil/gel barrier. In the column the height of the soil/gel barrier was 4.0 cm, and the porosity of the barrier was about 0.61. A solution of $ZnSO_4$ and $CdSO_4$ with concentrations of $Zn^{2+}$ and $Cd^{2+}$ of 530 ppm and 875 ppm, respectively, was prepared as a pollutant source. Also, 2.5% (wt./vol.) of yeast was added to the solution. The $Zn^{2+}$ and $Cd^{2+}$ concentrations below and above the barrier were monitored throughout the experimental period. After 9 days a yeast sample was collected, dissolved by adding strong acid (HCl), and the uptake of $Zn^{2+}$ and $Cd^{2+}$ was determined.

It was found that after 9 days 19.6% of $Cd^{2+}$ and 5.9% of $Zn^{2+}$ were taken up by the yeast, and 14.7% of $Cd^{2+}$ and 32.7% of $Zn^{2+}$ were adsorbed by the soil/gel barrier. Further, no $Zu^{2+}$ or $Cd^{2+}$ ions had penetrated the soil/gel barrier. The average ion uptake by the yeast was 5.5 mg $Cd^{2+}$/g yeast and 1.0 mg $Zn^{2+}$/g yeast. The ion exchange/adsorption content of the soil was 0.187 mg $Cd^{2+}$/g soil and 0.252 $Zn^{2+}$/g soil, respectively.

A control experiment using the same soil/gel in an identical column without yeast was conducted. After 9 days it was found that 33% of $Cd^{2+}$ and 38% of $Zn^{2+}$ were adsorbed by the soil/gel barrier, and no $Cd^{2+}$ and $Zu^{2+}$ ions had penetrated the soil/gel barrier. The average ion exchange/adsorption content of soil are 0.422 mg $Cd^{2+}$/g soil and 0.291 mg $Zn^{2+}$/g soil, respectively.

Column Experiment 3

A soil sample with porosity of 0.44 and a soil/gel barrier [ratio 4:1 (g/mL)] with a porosity of 0.46 was also tested. Soil was placed into a column, and the PAA gel precursor B (5% in water), as described above, was added and gelled in situ with crosslinking agent $Cr^{3+}$ to simulate the in situ soil/gel barrier. The concentrations of $Zn^{2+}$ ($ZnSO_4$) and $Cd^{2+}$ ($CdSO^4$) in the solution used as a pollutant source were 3110 ppm and 4170 ppm, respectively. No $Zu^{2+}$ or $Cd^{2+}$ ion penetrated the barrier in 11 days because of the high adsorption and/or ion exchange capacity of the soil.

All of the experiments showed that the gel barrier successfully inhibits migration of heavy metal contaminants out of the containment zone. Furthermore, it was demonstrated that yeast is an effective microorganism for taking up heavy metals from a pollutant source.

The present invention is, of course, in no way restricted to the specific disclosure of the specification and drawings, but also encompasses any modifications within the scope of the appened claims.

What I claim is:

1. A method of containing and remediating contaminants within the soil, said method comprising the steps of:
   placing a gel barrier into the soil for containing the contaminants, wherein the gel barrier and the soil contained therein form a containment zone, by:
   a) preparing an aqueous solution of a gel precursor;
   b) adding microorganisms, capable of remediating the contaminants in the soil, to the aqueous solution of the gel precursor;
   c) injecting the aqueous solution of the gel preursor together with the microorganisms into the soil at a desired location with a means for injecting;
   d) crosslinking in the soil the gel precursor to form the gel barrier, containing the microorganisms, at the desired location.

2. A method according to claim 1, further including the step of placing microorganisms into the soil.

3. A method according to claim 2, wherein in said step placing microorganisms into the soil the micoorganisms are placed only along an inner wall surface of said gel barrier.

4. A method according to claim 2, wherein said of placing the microorganisms is carried out by injection.

5. A method according to claim 4, wherein the microorganisms are injected after said step of injecting the aqueous solution.

6. A method according to claim 2, wherein said step of placing microorganisms includes the steps of preparing a nutrient solution and suspending the microorganisms in the nutrient solution.

7. A method according to claim 2, wherein said step of placing microorganisms includes the steps of suspending the microorganisms includes the steps of suspending the microorganisms in an aqueous solution.

8. A method according to claim 2, wherein said microorganisms are selected from the group consisting of fungi and yeasts.

9. A method according to claim 1, wherein the gel precursor comprises an organic monomer.

10. A method according to claim 9, wherein the gel precursor further comprises a cross-linking agent and a cross-linking catalyst.

11. A method according to claim 9, wherein the organic momomer is selected from the group consisting of ethylene oxide, hydroxyethyl methacrylate, acrylamide, vinyl chloride, and sulfone monomer.

12. A method according to claim 9, wherein the organic monomer is a mixture of urea and formaldehyde.

13. A method according to claim 1, wherein the gel precursor comprises alkali silicate.

14. A method according to claim 1, wherein said of injecting includes drilling a plurality of bore holes for reaching the method desired location within the soil.

15. A method according to claim 1, wherein said step of adding microorganisms includes the steps of preparing a nutrient solution and suspending the microorganisms in the nutrient solution.

16. A method according to claim 15, wherein the nutrient is a carbon source.

17. A method according to claim 16, wherein the carbon source is glucose.

18. A method according to claim 1, wherein said step of adding microoroganisms in an aqueous solution.

19. A method according to claim 1, wherein the microorganisms are yeasts.

20. A method according to claim 1, wherein the microorganisms are fungi.

21. A method according to claim 1, wherein the microorganism are yeasts and fungi.

22. A method according to claim 1, further including the step of adding an impermeability-increasing material to the gel barrier.

23. A system for containing and remediating contaminants within the soil, said system comprising:

a gel barrier installed in the soil wherein said gel barrier and the soil contained therein form a containment zone; and microorganisms added to said gel barrier during installation of said gel barrier, comprised of a polymer selected from the group consisting of polyethylene oxide, poly hydroxyethyl methacrylate, polyvinylchloride, polysulfone, sodium silicate polymer, polyacrylamide, and urea-formaldehyde polymer.

24. A system according to claim 23, wherein said microorganism are yeasts.

25. A system according to claim 23, wherein said microorganism are fungi.

26. A system according to claim 23, wherein said microorganism are yeasts and fungi.

27. A system according to claim 23, further comprising microorganisms added along an inner wall surface of said gel barrier.

28. A method according to claim 23, further comprising microorganisms added to the soil.

29. A method according to claim 23, wherein said gel barrier comprises an impermeability-increasing material.

* * * * *